United States Patent [19]

Yannazzone

[11] Patent Number: 5,103,702
[45] Date of Patent: Apr. 14, 1992

[54] METHOD OF CUTTING SLATS FOR A VENETIAN BLIND

[75] Inventor: Robert Yannazzone, Union, N.J.

[73] Assignee: Levolor Lorentzen, Inc., Parsippany, N.J.

[21] Appl. No.: 288,285

[22] Filed: Dec. 21, 1988

[51] Int. Cl.$^5$ .................. B23D 23/00; B26D 3/00
[52] U.S. Cl. .......................... 83/29; 83/39; 83/452; 83/94; 83/697; 83/929; 83/468.74
[58] Field of Search .............. 83/29, 39, 383, 384, 83/452, 468.94, 694, 697, 929, 953; 29/24.5

[56] References Cited

U.S. PATENT DOCUMENTS

| | | | |
|---|---|---|---|
| 1,474,048 | 11/1923 | Lynch | 83/29 |
| 1,647,254 | 11/1927 | Simmons | 83/29 |
| 2,936,665 | 5/1960 | Naffin | 83/694 |
| 3,370,492 | 2/1968 | Treff | 83/29 |
| 3,677,117 | 7/1972 | Cutter | 83/689 X |
| 3,799,022 | 3/1974 | Nagel et al. | 83/636 |
| 4,790,226 | 12/1988 | Tsuchida | 29/24.5 X |
| 4,823,449 | 4/1989 | Chang | 29/24.5 |
| 4,907,325 | 3/1990 | Hsu | 29/33 P |
| 4,932,301 | 6/1990 | Buck | 83/694 |

FOREIGN PATENT DOCUMENTS

| | | | |
|---|---|---|---|
| 395431 | 5/1924 | Fed. Rep. of Germany | 83/694 |
| 523402 | 4/1931 | Fed. Rep. of Germany | 83/694 |
| 1213214 | 11/1970 | United Kingdom | 83/29 |

*Primary Examiner*—Hien H. Phan
*Attorney, Agent, or Firm*—Thomas S. MacDonald

[57] ABSTRACT

Venetian blind slats are stacked and clamped onto a support, and confined laterally, while leaving ends beyond the desired length to which they are to be cut, un-confined. Then in one stroke in a direction perpendicular to the support, the ends of the stack are sheared-off by a punching tool having a cutting edge which contacts longitudinal margins prior to the center of the slats.

6 Claims, 1 Drawing Sheet

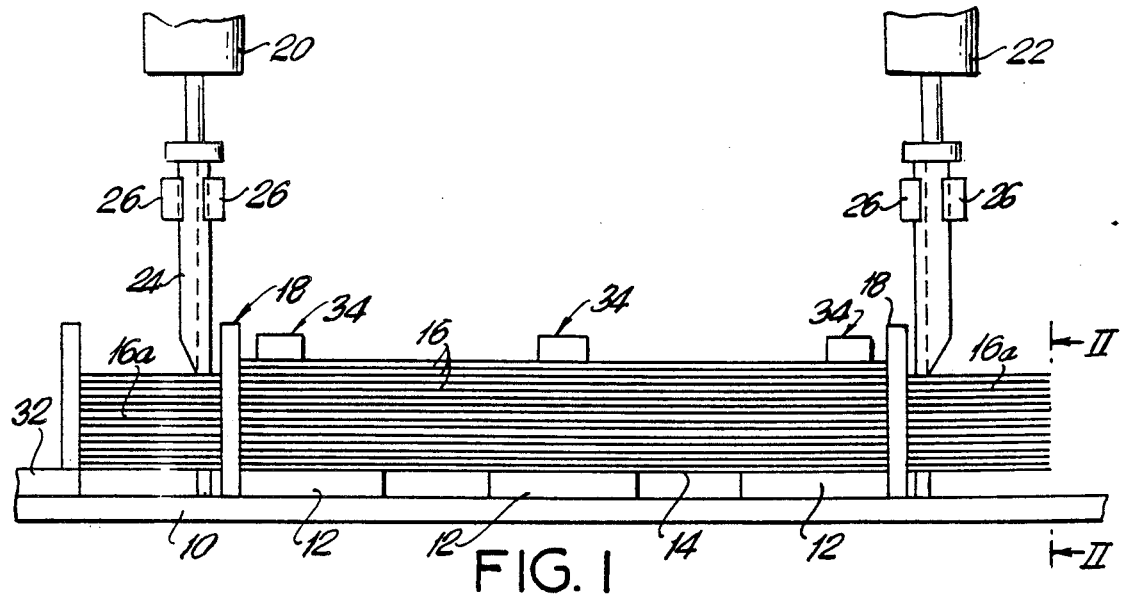
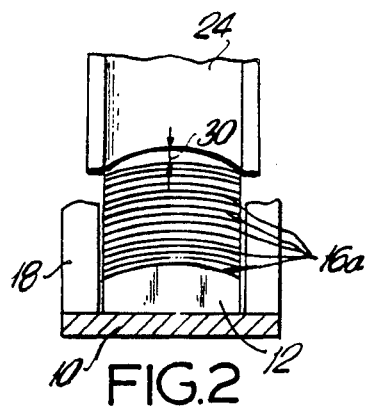
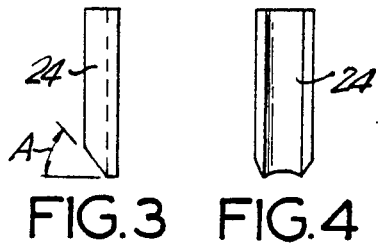
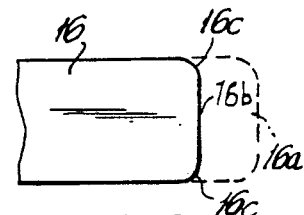
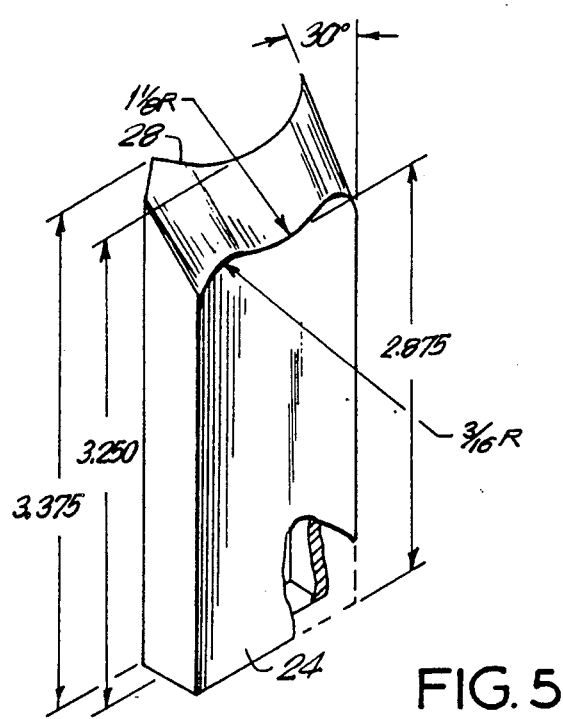

METHOD OF CUTTING SLATS FOR A VENETIAN BLIND

BACKGROUND OF THE INVENTION

The present invention relates to a method of and apparatus for cutting slats of a venetian blind to the desired length.

In the prior art known to applicant slat material, such as very thin aluminum sheet material, was fed from a roll into a machine with punch dies that were movable to different locations depending on the desired length of the slats. Thereafter, the sheet material was cut by the dies, whereupon the sheet material on the roll was advanced again, and cut again. In this way, slats were cut individually one by one.

It is the object of the present invention to provide a method of cutting a stack of venetian blind slats, for instance of vinyl or aluminum, to the required size, all at once.

Surprisingly, it has been found that this can be done without adversely affecting the quality of the slats. They have been found to be of the same quality as individually cut slats.

BRIEF DESCRIPTION OF THE DRAWINGS

The invention is illustrated, by way of example, in the accompanying drawings, in which:

FIG. 1 is a front elevational view of a machine for cutting a stack of vinyl or aluminum slats to appropriate length:

FIG. 2 is a section along line II—II of FIG. 1;

FIG. 3 is a front view of the cutting tool of the apparatus;

FIG. 4 is a side elevational view of the cutting tool of FIG. 3;

FIG. 5 is a perspective view of the cutting tool; and

FIG. 6 is a partial top view of a venetian blind slat.

DETAILED DESCRIPTION OF PREFERRED EMBODIMENTS

The apparatus used in the method of the present invention comprises a support 10 on which are placed shaped anvils 12 the upper surface 14 of which conforms to the curved bottom contour of slats 16 to be cut. A number of such slats 16, sufficient for a complete venetian blind, is stacked on top of the shaped anvil 12. Such stack may comprise 100 slats or more. The thickness of such slats may vary between 0.006 and 0.025 inches, depending on whether the material used is aluminum or vinyl. The slats are laterally guided and confined by guides 18. The guides are placed in the vicinity of punches 20 and 22. These may be driven by any appropriate and well known means, such as an air piston. One of the punches, 20, is stationarily arranged on support 10, whereas the other punch, 22, is movable along support 10. In this way, slats of any size blind may be cut with this apparatus. Each punch operates a cutting tool 24, guided by a stationary punch guide 26.

An example of a cutting tool that has proved successful is shown in FIG. 5. The shape of the lower part of cutting tool 24 is of critical importance for the method according to the invention. The cutting edge 28 of the punch must be such that it contacts the slats lying on the anvil along the longitudinal margins first, whereas there is a space 30 in the center so that the cutting proceeds from the edges toward the center. Also of critical importance is the angle A (see FIG. 3). It has to be in the range of from 25 to 35 degrees, and preferably close to 30 degrees.

The apparatus shown in FIG. 1 also has a stop 32. Initially, the stack of slats is fed against the stop 32 from the right in FIG. 1 so that all the slats are properly aligned against stop 32. Thereafter, shaped clamps 34 fasten the stack of slats 16 onto the shaped anvils 12, whereupon the stop 32 is removed. It is essential for the success of the method of the present invention that when the punches 20 and 22 are operated by an air piston or the like, the free ends 16a of the slats are unconfined, i.e. they must be allowed to fall away freely, without being impeded by anything, for instance by the stops 32 or clamps. This is necessary to obtain a smooth end 16b and smooth corners 16c of the finished cut slats.

With this simple apparatus surprisingly entire stacks of slats of aluminum or vinyl material can be cut efficiently, with precision and with smooth ends and corners.

I claim:

1. A method of cutting venetian blind slats to a desired length, comprising:
   stacking a plurality of slats, each of the slats having a convexly curved transverse surface and of a length exceeding the desired length, on top of one another to form a stack of slats on a support;
   providing a curved support surface on said support matching the curved transverse surface of the slats;
   aligning the ends of the slats in the stack;
   clamping the stack onto the support, and confining the stack laterally, over the desired length but leaving free ends of the slats beyond the desired length unconfined;
   shearing-off each free end of each of the slats of the stack in one stroke in a direction perpendicular to the support in seriatim with a tool having a cutting edge which contacts outer longitudinal margins of the slats before central portions thereof and which allows the sheared free ends to freely fall away.

2. An apparatus for cutting venetian blind slats to a desired longitudinal length, comprising:
   a support for receiving thereon a stack comprising a plurality of vertically aligned blind slats of a longitudinal length exceeding the desired length;
   means for clamping the stack of the support at positions between the ends of slats of the desired length;
   means for laterally confining the stack over the desired length, but leaving the ends thereof beyond the desired length freely un-confined;
   and tool means for shearing-off in one stroke each free end of the slats in the stack in a direction perpendicular to said support;
   said tool means including a punch with a cutting edge for contacting outer edge margins of the slats before central portions of the slats and wherein said cutting edge includes angular edge surfaces for allowing the free ends to fall away freely; and
   wherein an upper surface of the support facing the stack is convexly curved.

3. An apparatus according to claim 2, wherein the punch edge surfaces are arranged at an angle of from 25° to 35° with respect to a longitudinal axis of said punch.

4. An apparatus according to claim 3, wherein said angle is approximately 30°.

5. The apparatus according to claim 2 further including stop means for vertically aligning the slats in the stack and wherein said stop means is removable from the aligned slats after clamping the stack and before shearing-off each free end of the slats.

6. The apparatus according to claim 2 wherein said angular edge surfaces of the punch are at an angle of from 25° to 35° with respect to a longitudinal axis of said punch such that the sheared free ends of the stack fall away freely from the apparatus.

* * * * *